US012264694B2

(12) United States Patent
Ozaki

(10) Patent No.: US 12,264,694 B2
(45) Date of Patent: Apr. 1, 2025

(54) FASTENER

(71) Applicant: PIOLAX, INC., Kanagawa (JP)

(72) Inventor: Ryosuke Ozaki, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 204 days.

(21) Appl. No.: 17/921,475

(22) PCT Filed: Apr. 27, 2021

(86) PCT No.: PCT/JP2021/016863
§ 371 (c)(1),
(2) Date: Oct. 26, 2022

(87) PCT Pub. No.: WO2021/221079
PCT Pub. Date: Nov. 4, 2021

(65) Prior Publication Data
US 2023/0184280 A1 Jun. 15, 2023

(30) Foreign Application Priority Data
Apr. 28, 2020 (JP) .................................. 2020-079860

(51) Int. Cl.
*F16B 39/32* (2006.01)
*F16B 19/10* (2006.01)
(52) U.S. Cl.
CPC .................... *F16B 19/10* (2013.01)
(58) Field of Classification Search
CPC .......... F16B 19/10; F16B 5/06; F16B 5/0258; F16B 5/044; F16B 5/0064
(Continued)

(56) References Cited

U.S. PATENT DOCUMENTS 7,461,436 B2 * 12/2008 Asano ................ B60R 13/0206
24/453
9,657,759 B2 * 5/2017 Benedetti .............. F16B 5/0657
(Continued)

FOREIGN PATENT DOCUMENTS

JP  2003-130020 A  5/2003
JP  2014-506982 A  3/2014
(Continued)

OTHER PUBLICATIONS

Jul. 6, 2021, International Search Report issued for related PCT application No. PCT/JP2021/016863.
(Continued)

*Primary Examiner* — Gary W Estremsky
(74) *Attorney, Agent, or Firm* — Paratus Law Group, PLLC

(57) ABSTRACT

A fastener made of a metal material and for attaching a component to an attachment hole of an attachment member includes first and second leg pieces facing each other, and a connecting portion connecting base ends of the first and second leg pieces. The first leg piece includes a locking portion configured to be locked to an edge of the attachment hole, and a claw portion configured to retain the fastener to the component. The claw portion extends from a tip end side of the first leg piece and is configured to be inserted into a hole portion formed in a boss portion of the component. The second leg piece does not include a claw portion configured to be inserted into the hole portion and to retain the fastener to the component.

9 Claims, 7 Drawing Sheets

(58) Field of Classification Search
USPC .......................................................... 411/115
See application file for complete search history.

(56) References Cited

U.S. PATENT DOCUMENTS

| | | | |
|---|---|---|---|
| 2002/0005464 A1* | 1/2002 | Miura | F16B 21/075 248/231.9 |
| 2003/0079316 A1 | 5/2003 | Ogawa | |
| 2007/0033774 A1* | 2/2007 | Okada | F16B 21/075 24/289 |
| 2014/0000071 A1 | 1/2014 | Choi | |
| 2019/0048911 A1 | 2/2019 | Bidlake et al. | |

FOREIGN PATENT DOCUMENTS

| | | |
|---|---|---|
| JP | 2016-217377 A | 12/2016 |
| JP | 2020-193644 A | 12/2020 |

OTHER PUBLICATIONS

Jul. 6, 2021, International Search Opinion issued for related PCT application No. PCT/JP2021/016863.
Apr. 8, 2022, International Preliminary Report on Patentability issued for related PCT application No. PCT/JP2021/016863.
Apr. 8, 2022, Translation of International Preliminary Report on Patentability issued for related PCT Application No. PCT/JP2021/016863.

\* cited by examiner

FASTENER

CROSS REFERENCE TO PRIOR APPLICATION

This application is a National Stage Patent Application of PCT International Patent Application No. PCT/JP2021/016863 (filed on Apr. 27, 2021) under 35 U.S.C. § 371, which claims priority to Japanese Patent Application No. 2020-079860 (filed on Apr. 28, 2020), which are all hereby incorporated by reference in their entirety.

TECHNICAL FIELD

The present invention relates to a fastener for attaching a component to an attachment member.

BACKGROUND ART

Patent Literature 1 discloses a fastener for attaching an operation panel to an interior trim of a vehicle. The fastener includes a pair of leg pieces facing each other, a connecting portion that connects the pair of leg pieces, and a locking portion that is to be locked to a component. The locking portion is formed in an L shape in a side view, and a tip end portion of the locking portion is provided parallel to a facing direction of the pair of leg pieces. An attachment portion is inserted between the pair of leg pieces, and the tip end portion of the locking portion comes into contact with the attachment portion and is deflected, and inserted into an attachment hole of the attachment portion for locking.

CITATION LIST

Patent Literature

Patent Literature 1: JP2016-217377A

SUMMARY OF INVENTION

Technical Problem

In the technique disclosed in Patent Literature 1, the leg pieces and the locking portion are both connected to the connecting portion, and thus are deflected individually. The locking portion is shorter than the leg pieces and is difficult to be deflected, and thus the locking portion is difficult to be deformed when being attached to the attachment portion, and an attachment work may not be easy.

An object of the present invention is to provide a fastener that is easily attached to a boss portion of a component.

Solution to Problem

In order to solve the above problem, an aspect of the present invention is a fastener made of a metal material and for attaching a component to an attachment hole of an attachment member, the fastener including: a first leg piece and a second leg piece facing each other; and a connecting portion connecting base ends of the first leg piece and the second leg piece. The first leg piece includes: a locking portion configured to be locked to an edge of the attachment hole; and a claw portion configured to retain the fastener to the component. The claw portion extends from a tip end side of the first leg piece and is configured to be inserted into a hole portion formed in a boss portion of the component. The second leg piece does not include a claw portion configured to be inserted into the hole portion formed in the boss portion of the component and retain the fastener to the component.

Advantageous Effects of Invention

According to the present invention, it is possible to provide a fastener that is easily attached to a boss portion of a component.

DESCRIPTION OF EMBODIMENTS

Figure 1:
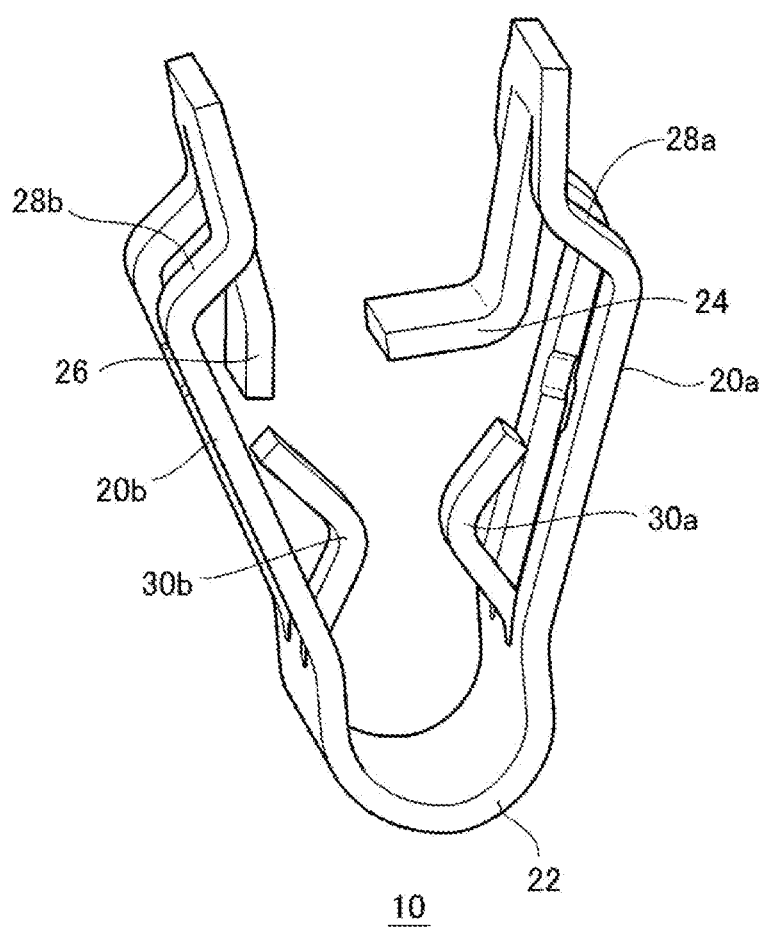
FIG. 1 is a perspective view of a fastener.
Figure 2:
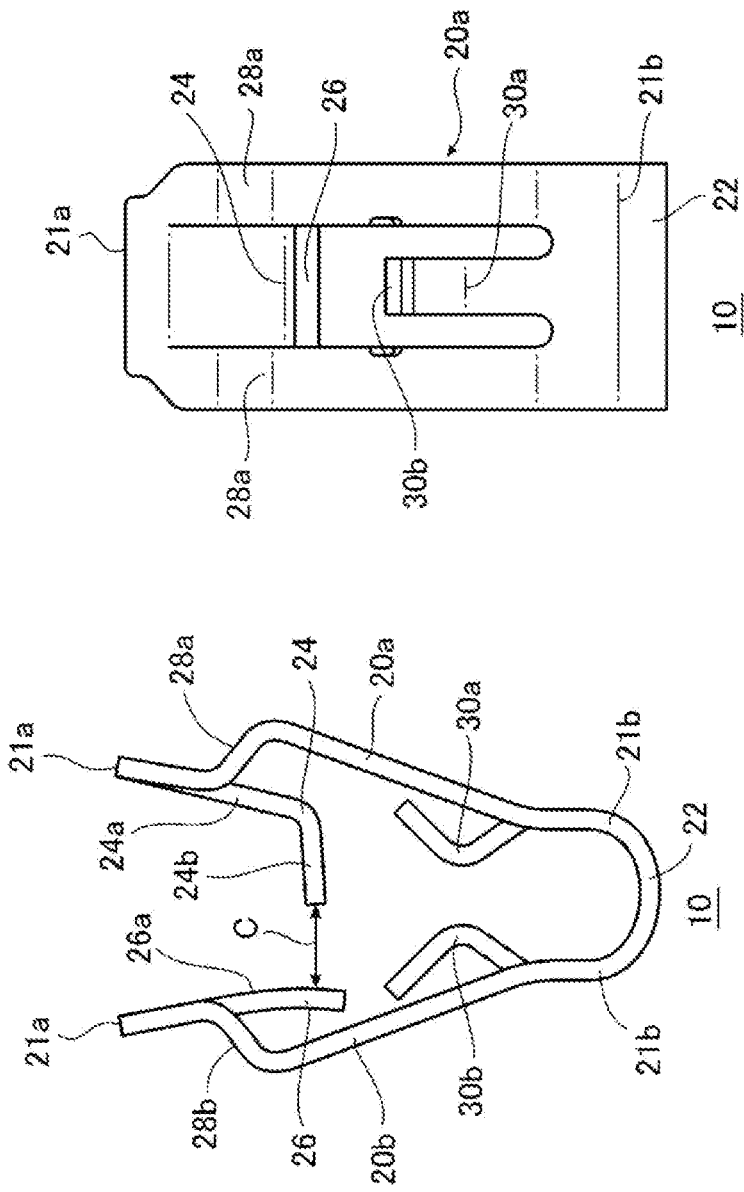
FIG. 2A is a side view of the fastener.
FIG. 2B is a front view of the fastener.

FIG. 1 is a perspective view of a fastener 10. In addition, FIG. 2A is a side view of the fastener 10, and FIG. 2B is a front view of the fastener 10. The fastener 10 is used to attach a component to an attachment member. The component may be an in-vehicle component such as an operation panel provided with a switch for opening and closing a window, or a decorative component having a design such as a cover. The attachment member may be a trim panel, a vehicle body panel, or the like.

The fastener 10 is made of a metal material, and is formed by cutting and pressing a metal plate. The fastener 10 is made of a metal material, and thus can obtain a higher extraction force than in a case of being made of a resin material. The fastener 10 includes a first leg piece 20a, a second leg piece 20b, a connecting portion 22, a first holding portion 30a, and a second holding portion 30b.

The first leg piece 20a and the second leg piece 20b face each other. A direction in which the first leg piece 20a and the second leg piece 20b (referred to as a "leg piece 20" when not distinguished) face each other is referred to as a facing direction. The first leg piece 20a and the second leg piece 20b are deflectable in the facing direction, and are deflectable so as to approach or separate from each other.

A tip end 21a of the first leg piece 20a is a free end, and a base end 21b of the first leg piece 20a is connected to the connecting portion 22. The connecting portion 22 connects the base end 21h of the first leg piece 20a and a base end 21b of the second leg piece 20b. The first leg piece 20a includes a claw portion 24 and a first locking portion 28a, and the second leg piece 20b includes a guide portion 26 and a second locking portion 28b.

The first locking portion 28a is bent outward in the facing direction in a middle of the first leg piece 20a, and the second locking portion 28b is bent outward in the facing direction in a middle of the second leg piece 20b. Each of the first locking portion 28a and the second locking portion 28b has an inclined surface extending outward in the facing direction, and the inclined surface is locked to a back edge of an attachment hole formed in the attachment member.

The first holding portion 30a and the second holding portion 30b extend from a base end 21h side of the leg piece 20 toward a tip end 21a side, extend so as to approach each other, are bent in the middle, and extend so as to be separated from each other. The first holding portion 30a and the second holding portion 30b sandwich a boss portion of the component. A length of the first holding portion 30a in an extending direction is shorter than that of the second holding portion 30b. The first holding portion 30a and the second holding portion 30b may extend from the connecting portion 22 instead of from the leg piece 20.

The claw portion 24 is formed as a cantilever extending from a tip end side of the first leg piece 20a and extending from the first leg piece 20a. The first leg piece 20a and the claw portion 24 are deflected in conjunction with each other. The claw portion 24 includes a first extending portion 24a and a second extending portion 24b. The first extending portion 24a extends from the tip end 21a side of the first leg piece 20a toward the connecting portion 22. The second extending portion 24b is bent from the first extending portion 24a and projects toward the second leg piece 20b. By providing the first extending portion 24a, the claw portion 24 can be increased in an entire length and deflected easily as compared with a case where the second extending portion 24b is provided alone.

The second extending portion 24b is inclined with respect to the facing direction of the leg pieces 20, and extends toward the connecting portion 22, that is, toward the base end 21b side. That is, the second extending portion 24b does not extend parallel to the facing direction, but extends so as to slightly hang down to a connecting portion 22 side.

The second leg piece 20b includes the guide portion 26 that guides insertion of the boss portion of the component. The guide portion 26 has a guide surface 26a extending from the tip end 21a side of the second leg piece 20b toward the base end 21b side. The guide surface 26a is a flat surface and may uniformly extend from a tip end 21a of the second leg piece 20b.

The second extending portion 24b of the claw portion 24 projects toward the guide portion 26. The second extending portion 24b and the guide portion 26 have an overlapping region in a direction from the tip end 21a to the base end 21b and face each other. The claw portion 24 and the guide portion 26 are formed by hollowing out the first leg piece 20a and the second leg piece 20b.

A gap between the first leg piece 20a and the second leg piece 20b serves as a path through which the boss portion of the component is inserted, and a shortest interval C between a tip end portion of the second extending portion 24b and the guide portion 26 is set to a length through which the boss portion can pass.

Figure 3:
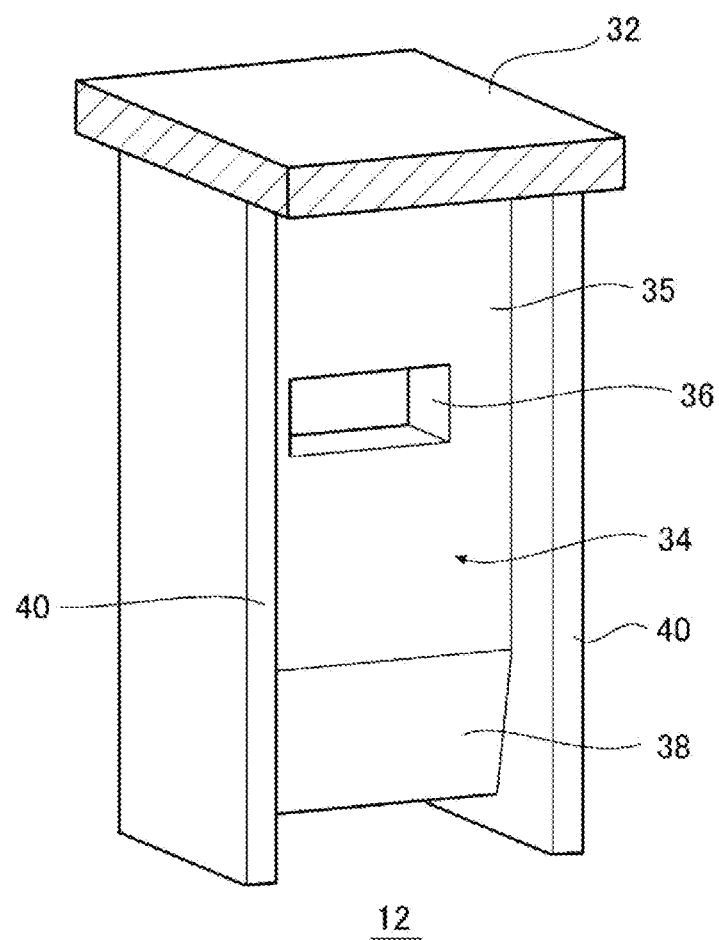
FIG. 3 is a perspective view of a boss portion of a component.

FIG. 3 is a perspective view of a boss portion 34 of a component 12. The component 12 includes a panel 32 and the boss portion 34. The panel 32 may be an operation panel exposed on a surface. A plurality of boss portions 34 hang down from a back surface of the panel 32.

The boss portion 34 includes a boss main body 35, a hole portion 36, a tapered portion 38, and side wall portions 40. The boss main body 35 is formed in a flat plate shape. The hole portion 36 is formed through the boss main body 35 at a substantially central position. The tapered portion 38 is formed such that a tip end of the boss main body 35 is thinned. A pair of side wall portions 40 are formed on both sides of the boss main body 35. The side wall portions 40 restrict movement of the fastener 10 in a width direction.

Figure 4:
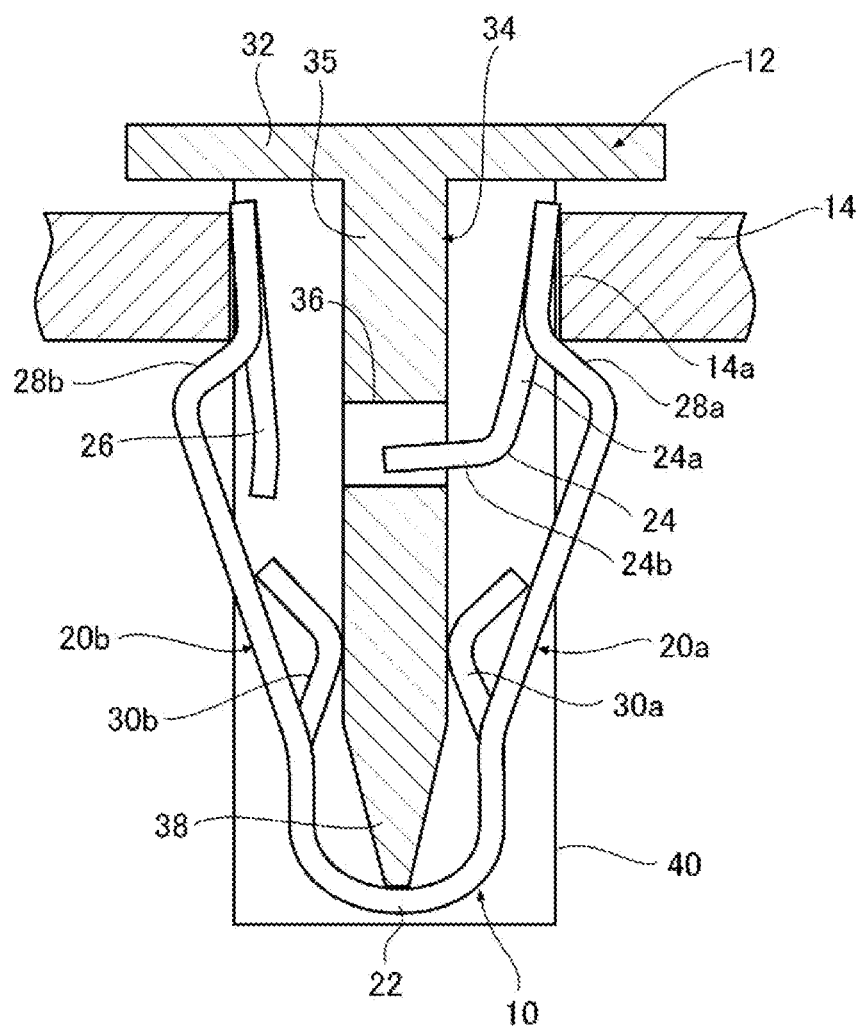
FIG. 4 is a side view of the fastener attached to the component and an attachment member.

FIG. 4 is a side view of the fastener 10 attached to the component 12 and an attachment member 14. The fastener 10, the component 12 and the attachment member 14 comprise an attachment structure. The attachment structure is a structure to attach the component 12 to the attachment member 14 with the fastener 10. The fastener 10 is attached to the boss portion 34 of the component 12, and then attached to an attachment hole 14a of the attachment member 14. The fastener 10 is not removed from the boss portion 34, but is pulled out from the attachment hole 14a when the panel 32 of the component 12 fails. When the component 12 is to be lifted in a direction away from the attachment member 14 with a predetermined force or more, the fastener 10 is pulled out from the attachment hole 14a without requiring an operation to cause the pair of leg pieces 20 to approach each other.

The first holding portion 30a and the second holding portion 30b sandwich the boss main body 35 of the boss portion 34. Accordingly, even when the component 12 is conveyed with the fastener 10 attached thereto, an attachment posture of the fastener 10 can be stabilized.

The second extending portion 24b of the claw portion 24 is inserted into the hole portion 36 to retain the fastener 10 to the component 12. A tip end of the claw portion 24 is located on a second leg piece 20b side with respect to a center position of the hole portion 36, and the claw portion 24 sufficiently enters the hole portion 36. Accordingly, the fastener 10 is attached so as not to be detached from the boss portion 34.

The first locking portion 28a and the second locking portion 28b are locked to a back edge of the attachment hole 14a of the attachment member 14. Accordingly, the fastener 10 is fixed to the attachment member 14. When the first leg piece 20a and the second leg piece 20b are deflected so as to approach each other, locking of the first locking portion 28a and the second locking portion 28b is released. Therefore, when the component 12 is to be replaced, the fastener 10 can be pulled out from the attachment hole 14a.

Figure 5:
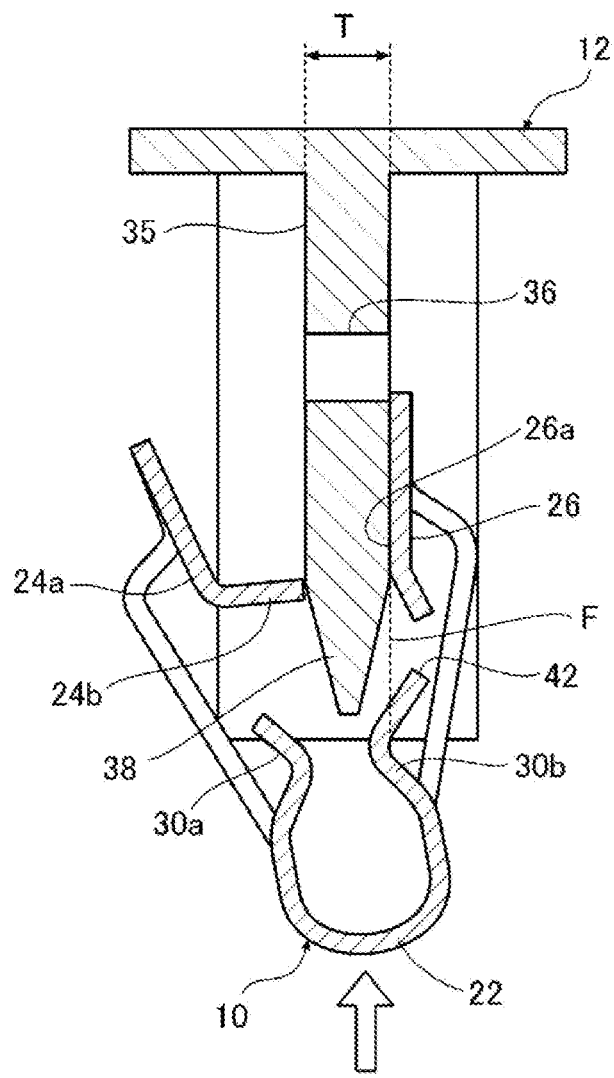
FIG. 5 is a view showing attachment of the fastener to the boss portion.

FIG. 5 is a view showing the attachment of the fastener 10 to the boss portion 34. FIG. 5 shows a state in which the fastener 10 is being attached to the boss portion 34. An operator positions the tapered portion 38 of the boss portion 34 between the first leg piece 20a and the second leg piece 20b, and pushes the connecting portion 22. Accordingly, the boss portion 34 is inserted between the first leg piece 20a and the second leg piece 20b. When the boss portion 34 is to be inserted between the first leg piece 20a and the second leg piece 20b, the boss portion 34 comes into contact with the claw portion 24, is moved toward a guide portion 26 side, and is guided by the guide surface 26a. A side surface of the boss main body 35 comes into surface contact with the guide surface 26a by the guide portion 26.

The claw portion 24 is formed on the first leg piece 20a, while no claw portions are not formed on the second leg piece 20b. Accordingly, when the boss portion 34 is inserted between the first leg piece 20a and the second leg piece 20b, it is possible to prevent an increase in an insertion force as compared with a case where claw portions are provided on both of the first leg piece 20a and the second leg piece 20b. The guide portion 26 is formed on the second leg piece 20b, and thus it is easy to guide the boss portion 34 toward the connecting portion 22.

A tip end 42 of the second holding portion 30b is provided at a position away from the first leg piece 20a with respect to an imaginary line F obtained by extending the guide surface 26a in a side view (in view from the width direction of the fastener 10), that is, at a position on the second leg piece 20b side. That is, the tip end 42 of the second holding portion 30b is located at a position (a right side in FIG. 5)

farther from the first leg piece 20a with respect to the imaginary line F. Accordingly, a tip end of the boss portion 34 can be prevented from being caught by the tip end 42 of the second holding portion 30b at the time of insertion, and the boss portion 34 can be smoothly attached. The tip end 42 of the second holding portion 30b is provided at a position on the second leg piece 20b side with respect to an imaginary plane obtained by extending the guide surface 26a.

The shortest interval C between the second extending portion 24b and the guide portion 26 shown in FIG. 2A is set to a distance of 80% or more and less than 100% of a thickness T of the boss portion 34. The thickness T of the boss portion 34 refers to a thickness of a plate excluding the tapered portion 38 on a tip end side, and refers to a plate thickness around the hole portion 36 not including the side wall portions 40. The shortest interval C between the second extending portion 24b and the guide portion 26 refers to an interval in a free state in which no external force is applied to the first leg piece 20a and the second leg piece 20b.

The shortest interval C is set to a distance less than 100% of the thickness T, and thus the boss main body 35 cannot be passed unless at least the first leg piece 20a and the second leg piece 20b are deflected, so that the claw portion 24 is less likely to be detached. In addition, the shortest interval C is set to a distance of 80% or more of the thickness T, and thus it is possible to reduce an insertion force into the boss portion 34. In order to reduce the insertion force into the boss portion 34, it is more preferable to set the shortest interval C to a distance of 90% or more of the thickness T.

Figure 6:
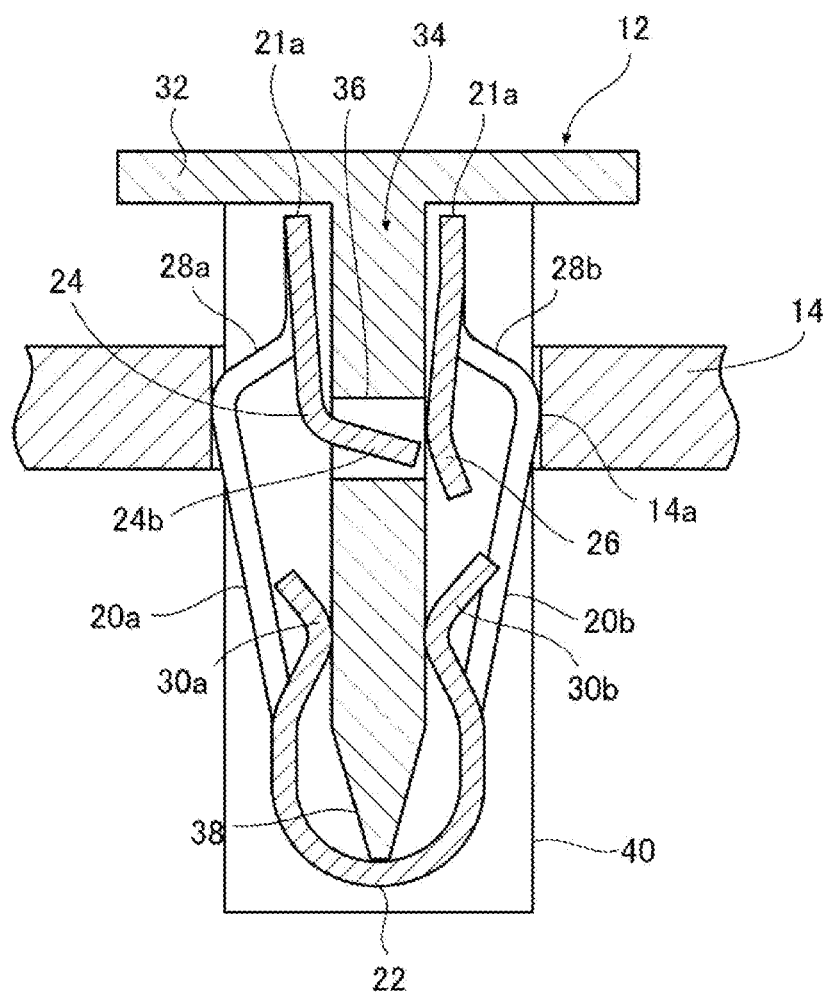
FIG. 6 is a view showing attachment of the fastener to the attachment member.

FIG. 6 is a view showing the attachment of the fastener 10 to the attachment member 14. The fastener 10 is inserted into the attachment hole 14a of the attachment member 14 in a state of being attached to the boss portion 34 of the component 12.

At this time, a length of the fastener 10 is set such that the tip end of the boss portion 34 comes into contact with the connecting portion 22 and the tip end 21a of the leg piece 20 does not come into contact with the back surface of the panel 32. Accordingly, the boss portion 34 and the fastener 10 are integrally pushed into the attachment hole 14a, and thus can be easily inserted.

The pair of leg pieces 20 come into contact with an inner surface of the attachment hole 14a and are deflected so as to approach each other. At this time, the second extending portion 24b is pushed into the hole portion 36, but the second extending portion 24b is provided so as not to come into contact with the hole portion 36. That is, a shape of the second extending portion 24b is set such that a tip end of the second extending portion 24b does not come into contact with the hole portion 36 in a stale where the tip end of the boss portion 34 is in contact with the connecting portion 22. An inner surface of the leg piece 20 is provided so as not to come into contact with the side surface of the boss main body 35. Accordingly, when the pair of leg pieces 20 approach each other, the second extending portion 24b slides on an inner surface of the hole portion 36 so as not to generate friction against the approach of the leg pieces 20, and the inner surface of the leg piece 20 comes into contact with the side surface of the boss main body 35 so as not to restrict the approach of the pair of leg pieces 20, thereby reducing the insertion force into the attachment hole 14a.

Figure 7A:
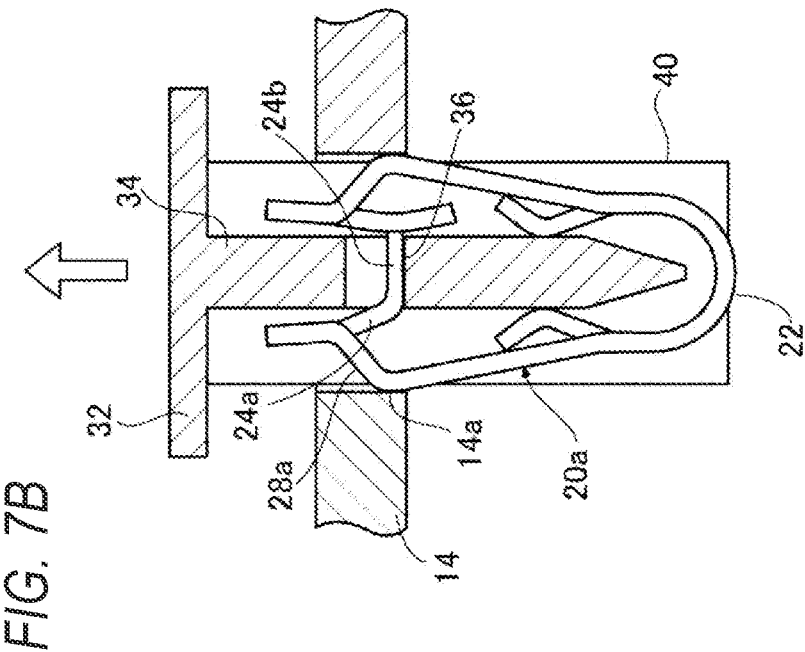
FIGS. 7A and 7B are views showing pull-out of the fastener from the attachment member.
Figure 7B:
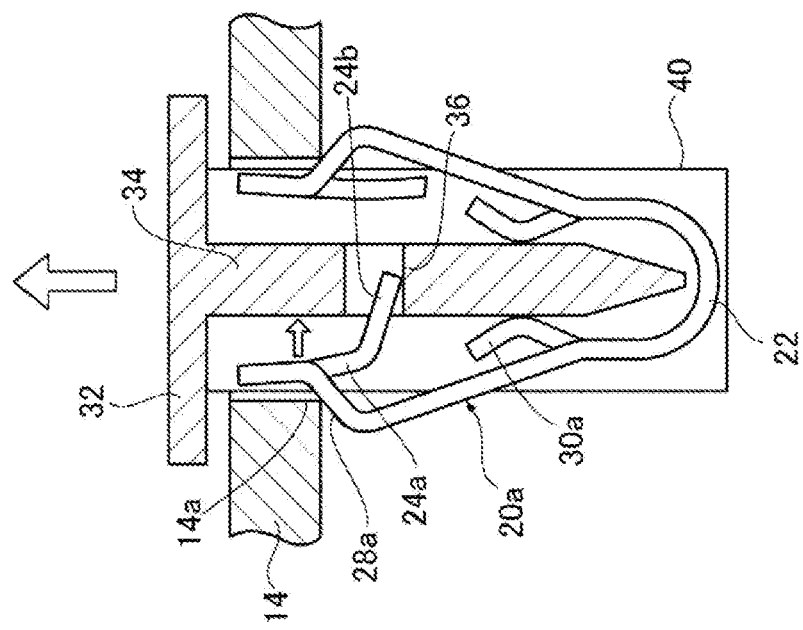

FIGS. 7A and 7B are views showing the pull-out of the fastener 10 from the attachment member 14. When the boss portion 34 shown in FIG. 4 is to be pulled out upward from the attachment hole 14a, the tip end of the second extending portion 24b shown in FIG. 7A comes into contact with the inner surface of the hole portion 36, the second extending portion 24b receives a pull-out load, and the fastener 10 is pulled out together with the boss portion 34. The boss portion 34 is lifted, and thus the tip end of the boss portion 34 is separated from the connecting portion 22.

The first locking portion 28a and the second locking portion 28b come into contact with the back edge of the attachment hole 14a and receive an inward force in the facing direction, and the first leg piece 20a and the second leg piece 20b are deflected so as to approach each other. Accordingly, the claw portion 24 moves so as to further enter the hole portion 36. In this way, even when the claw portion 24 is inserted into the hole portion 36 for retaining, the claw portion 24 is movable together with the first leg piece 20a. At this time, the second extending portion 24b slides on the inner surface of the hole portion 36, and thus the friction against the approach of the leg pieces 20 is generated, and a high extraction force can be obtained.

When the boss portion 34 is to be lifted further upward, the inner surface of the hole portion 36 pushes up the tip end of the second extending portion 24b, the tip end of the second extending portion 24b is lifted, and the claw portion 24 is deformed such that the second extending portion 24b comes into surface contact with the inner surface of the hole portion 36, as shown in FIG. 7B. This is because the second extending portion 24b is inclined with respect to the facing direction of the leg pieces 20 and hangs down so as to extend toward the base end 21b side of the leg piece 20, and thus can be deformed in conjunction with the pull-out of the boss portion 34. Accordingly, it is possible to avoid a situation in which the tip end of the second extending portion 24b bites into the inner surface of the hole portion 36 to prevent the claw portion 24 from moving, so as to restrict the deflection of the first leg piece 20a approaching the second leg piece 20b. Therefore, it is possible to prevent damage to the boss portion 34 and the claw portion 24 caused by forcibly lifting the boss portion 34 in a state in which the tip end of the second extending portion 24b bites into the inner surface of the hole portion 36.

When the first leg piece 20a and the second leg piece 20b smoothly approach each other due to the deformation of the claw portion 24, and the first locking portion 28a and the second locking portion 28b pass through the attachment hole 14a, the boss portion 34 and the fastener 10 can be pulled out from the attachment hole 14a.

The present invention is not limited to the embodiment described above and various modifications such as design changes can be added to the embodiment based on knowledge of a person skilled in the art. Embodiments to which such modifications are added can also be included in the scope of the present invention.

INDUSTRIAL APPLICABILITY

The present invention relates to the fastener for attaching a component to an attachment member.

REFERENCE SIGNS LIST

10: fastener
12: component
14: attachment member
14a: attachment hole
20a: first leg piece
20b: second leg piece
21a: tip end
21b: base end
22: connecting portion 24: claw portion
24a: first extending portion
24b: second extending portion
26: guide portion
26a: guide surface
28a: first locking portion
28b: second locking portion
30a: first holding portion
30b: second holding portion
32: panel
34: boss portion
35: boss main body
36: hole portion

The invention claimed is:

1. A fastener made of a metal material and for attaching a component to an attachment hole of an attachment member, the fastener comprising:
 a first leg piece and a second leg piece facing each other; and
 a connecting portion connecting base ends of the first leg piece and the second leg piece, wherein
 the first leg piece includes:
  a locking portion configured to be locked to an edge of the attachment hole; and
  a claw portion configured to retain the fastener to the component,
 the claw portion extends from a tip end side of the first leg piece and is configured to be inserted into a hole portion formed in a boss portion of the component,
 the second leg piece does not include a claw portion configured to be inserted into the hole portion formed in the boss portion of the component and configured to retain the fastener to the component,
 the second leg piece includes a guide portion having a guide surface extending from a tip end side of the second leg piece toward a base end side of the second leg piece, and
 the first leg piece, the second leg piece, the connecting portion, the locking portion and the claw portion are formed at a same plate thickness.

2. The fastener according to claim 1, wherein the claw portion includes:
 a first extending portion extending from the tip end side of the first leg piece toward the connecting portion; and
 a second extending portion bent from the first extending portion, projecting toward the second leg piece, and configured to be inserted into the hole portion, and
 the second extending portion is inclined with respect to a facing direction of the first leg piece and the second leg piece, and extends toward a base end side of the first leg piece.

3. The fastener according to claim 1, further comprising:
 a first holding portion and a second holding portion that are configured to sandwich the boss portion, wherein
 a tip end of the second holding portion formed on the second leg piece is provided at a position on a second leg piece side with respect to an imaginary line obtained by extending the guide surface in a side view.

4. The fastener according to claim 1, wherein the claw portion is formed as a cantilever extending from the first leg piece.

5. The fastener according to claim 1, wherein the claw portion is formed by hollowing out the first leg piece.

6. The fastener according to claim 1, wherein the guide portion is formed by hollowing out the second leg piece.

7. The fastener according to claim 1, further comprising:
 a first holding portion and a second holding portion that are configured to sandwich the boss portion, wherein
 the first holding portion is formed by hollowing out the first leg piece, and
 the second holding portion is formed by hollowing out the second leg piece.

8. A fastener made of a metal material and for attaching a component to an attachment hole of an attachment member, the fastener comprising:
 a first leg piece and a second leg piece facing each other; and
 a connecting portion connecting base ends of the first leg piece and the second leg piece, wherein
 the first leg piece includes:
  a locking portion configured to be locked to an edge of the attachment hole; and
  a claw portion configured to retain the fastener to the component,
 the claw portion extends from a tip end side of the first leg piece and is configured to be inserted into a hole portion formed in a boss portion of the component,
 the second leg piece does not include a claw portion configured to be inserted into the hole portion formed in the boss portion of the component and configured to retain the fastener to the component,
 the second leg piece includes a guide portion having a guide surface extending from a tip end side of the second leg piece toward a base end side the second leg piece, and
 a shortest interval between the claw portion and the guide portion is configured to be set to a distance of 80% or more and less than 100% of a thickness of the boss portion.

9. A fastener made of a metal material and for attaching a component to an attachment hole of an attachment member, the fastener comprising:
 a first leg piece and a second leg piece facing each other,
 a connecting portion connecting base ends of the first leg piece and the second leg piece; and
 a first holding portion and a second holding portion that are configured to sandwich a boss portion of the component, wherein
 the first leg piece includes:
  a locking portion configured to be locked to an edge of the attachment hole; and
  a claw portion configured to retain the fastener to the component,
 the claw portion extends from a tip end side of the first leg piece and is configured to be inserted into a hole portion formed in the boss portion of the component,
 the second leg piece does not include a claw portion configured to be inserted into the hole portion formed in the boss portion of the component and configured to retain the fastener to the component,
 the second leg piece includes a guide portion having a guide surface extending from a tip end side of the second leg piece toward a base end side of the second leg piece,
 the first holding portion and the second holding portion are positioned on a side of the connecting portion with respect to the claw portion,
 the first holding portion includes:
  a first portion extending from a base end side of the first leg piece toward the second leg piece; and a second portion extending from the first portion toward the first leg piece via a first bent portion, and the second holding portion includes:
a third portion extending from the base end side of the second leg piece toward the first leg piece; and
a fourth portion extending from the third portion toward the second leg piece via a second bent portion.

* * * * *